United States Patent [19]

Kushi

[11] Patent Number: 4,947,820
[45] Date of Patent: Aug. 14, 1990

[54] COMBUSTION CONTROL SYSTEM FOR INTERNAL COMBUSTION ENGINE ADAPTABLE TO ON AND OFF OF EXHAUST GAS RECIRCULATION

[75] Inventor: Naoto Kushi, Toyota, Japan
[73] Assignee: Toyota Jidosha Kabushiki Kaisha, Aichi, Japan
[21] Appl. No.: 307,752
[22] Filed: Feb. 8, 1989
[30] Foreign Application Priority Data Feb. 8, 1988 [JP] Japan ................... 63-26810

[51] Int. Cl.⁵ .......................................... F02M 25/07
[52] U.S. Cl. .................................... 123/571; 123/416; 123/478
[58] Field of Search ............... 123/478, 480, 416, 417, 123/568, 569, 571

[56] References Cited

U.S. PATENT DOCUMENTS

| | | | |
|---|---|---|---|
| 4,448,178 | 5/1984 | Yamato et al. | 123/571 |
| 4,450,808 | 5/1984 | Moriyama et al. | 123/571 X |
| 4,553,518 | 11/1985 | Takao et al. | 123/571 X |
| 4,598,684 | 7/1986 | Kato et al. | 123/571 X |
| 4,782,810 | 11/1988 | Shimoda et al. | 123/571 |
| 4,848,303 | 7/1989 | Fujimoto et al. | 123/571 |
| 4,881,509 | 11/1989 | Ohashi et al. | 123/571 |

FOREIGN PATENT DOCUMENTS

| | | |
|---|---|---|
| 0027130 | 4/1973 | Japan . |
| 0192838 | 11/1984 | Japan . |
| 0169641 | 9/1985 | Japan . |
| 61-4836 | 1/1986 | Japan . |

Primary Examiner—Willis R. Wolfe
Attorney, Agent, or Firm—Kenyon & Kenyon

[57] ABSTRACT

A combustion control system for an internal combustion engine operable with the exhaust gas recirculation, the control system determining a basic quantity of engine combustion control such as a basic amount of fuel injection and/or ignition timing based upon the intake pressure of the engine, wherein the amount of fuel injection and/or the ignition timing is modified when the engine is operating with the exhaust gas recirculation starting with a time delay from the time point of switching on of an exhaust gas recirculation on-off valve, the time delay being variably controlled according to an operational condition of the engine such as the difference between atmospheric pressure and the intake pressure or the ratio of the intake pressure to atmosheric pressure.

11 Claims, 9 Drawing Sheets

COMBUSTION CONTROL SYSTEM FOR INTERNAL COMBUSTION ENGINE ADAPTABLE TO ON AND OFF OF EXHAUST GAS RECIRCULATION

BACKGROUND OF THE INVENTION

1. Field of the Invention

The present invention relates to a combustion control system for an internal combustion engine, and, more particularly, to a combustion control system for an internal combustion engine which operates selectively with or without the exhaust gas recirculation.

2. Description of the Prior Art

As a type of fuel injection control in the internal combustion engine it is known to control the amount of fuel injection based upon the intake pressure or, in fact, vacuum in the intake passage of the engine according to a prearranged correlation between the intake pressure and the requirement for fuel injection in the engine. When such a fuel injection control system is employed in the internal combustion engine which operates selectively with or without the exhaust gas recirculation, the amount of fuel injection determined from the prearranged correlation between the intake pressure and the amount of fuel injection needs to be modified according to whether the engine is operating with the exhaust gas recirculation or not with the exhaust gas recirculation, because on the one hand the intake pressure rises (or the intake vacuum decreases) by the introduction of exhaust gas into the intake passage in respect to the same required amount of fuel injection, while on the other hand the requirement for fuel injection should desirably be raised for the same amount of fresh intake air under the exhaust gas recirculation to make a compensation for a reduction of combustibility of fuel due to mixing of the exhaust gas into fresh air. Such an art of modification of fuel injection is described in, for example, Japanese Patent Laying-open Publication No. 48-27130 (1973) and Japanese Patent Laying-open Publication No. 61-4836 (1986).

It is also known to control on and off of the exhaust gas recirculation by an exhaust gas recirculation control valve powered by the intake vacuum of the engine. Such a control system is unavoidably bound with a delay of operation that the exhaust gas recirculation is virtually started or stopped after the lapse of a substantial period from the time point of decision by the control system for the starting or stopping of the exhaust gas recirculation. Therefore, it has already been proposed to incorporate a delay time control in the fuel supply control system for the internal combustion engine operable with the exhaust gas recirculation as described in, for example, Japanese Patent Laying-open Publication No. 59-192838 (1984), Japanese Patent Laying-open Publication No. 60-169641 (1985) and Japanese Patent Laying-open Publication No. 61-4836 (1986).

However, the amount of delay in response in the starting and stopping of the exhaust gas recirculation differs according to the intake pressure and the rotational speed of the engine. Therefore, if the amount of delay is set to a constant value, the amount of fuel supply is not always ensured to be proper according to a difference in operational conditions of the engine. For example, if the delay time at the starting of the exhaust gas recirculation is determined to an amount appropriate for low load operation of the engine, the amount of delay time would be deficient in high load operation of the engine, because the intake vacuum decreases in high load operation of the engine, thereby causing too early modification of the fuel supply amount for exhaust gas recirculation. Therefore, if the modification is a fuel decreasing modification, the engine must operate with too lean fuel air mixture, and the stability of the engine is deteriorated.

On the other hand, fluctuations of the delay in response in the starting and stopping of the exhaust gas recirculation also substantially affect the optimization of the ignition timing for starting the combustion of the fuel-air mixture in the combustion chamber of the engine, because the most desirable timing for ignition substantially differs according to the rate of exhaust gas recirculated into the combustion chamber. Therefore, it is desirable if the ignition system is adapted to the virtual delay of starting and stopping of exhaust gas recirculation.

SUMMARY OF THE INVENTION

The object of the present invention is to obviate the above-mentioned problems in the prior art fuel supply control systems and the ignition system and to provide an improved combustion control system for an internal combustion engine by which the supply of fuel is more appropriately controlled in relation with on and off of the exhaust gas recirculation with further optimization of ignition timing also in relation with on and off of the exhaust gas recirculation.

According to the present invention the above-mentioned object is accomplished, for an internal combustion engine having an intake passage, an exhaust passage, and an exhaust gas recirculation system including an exhaust gas recirculation passage for recirculating exhaust gas from said exhaust passage to said intake passage, an exhaust gas recirculation control valve powered by a difference between atmospheric pressure and intake pressure in said intake passage for variably throttling said exhaust gas recirculation passage, and an exhaust gas recirculation on-off valve selectively put on or off so as, when put on, to supply said intake pressure to said exhaust gas recirculation control valve and, when put off, to interrupt supply of said intake pressure to said exhaust gas recirculation control valve, by a combustion control system comprising: a first means for determining a basic quantity of engine combustion control parameter according said intake pressure, a second means selectively put on and off so as, when put on, to modify said basic quantity of engine combustion control parameter so as thereby to provide a modified quantity of engine combustion control parameter for adaptation to operation of the engine with exhaust gas recirculation and, when put off, to undo such modification to the basic quantity of engine combustion control parameter, and a third means for delaying the putting on and off of said second means from the time point of putting on and off of said exhaust gas recirculation on-off valve for a time duration determined according to an operational condition of the engine.

By employing a combustion control system of the above-mentioned construction the modification of the quantity of engine combustion control parameter such as the amount of fuel injection and/or the ignition timing for adaptation to the exhaust gas recirculation is carried out by always keeping a correct timing with the virtual on and off of the exhaust gas recirculation, so that the engine is operated in a stable combustion state in high efficiency all through on and off transitional regions of the exhaust gas recirculation.

In the above-mentioned combustion control system said third means may determine said variable time duration according to the difference between atmospheric pressure and intake pressure of the engine so that said variable time duration is smaller as said difference is larger.

Further, said third means may further modify said variable time duration according to rotational speed of the engine so that said variable time duration is larger for a same amount of the difference of atmospheric pressure and intake pressure of the engine as the rotational speed of the engine is greater.

Alternatively, said third means may further modify said variable time duration according to rate of acceleration of the engine.

Alternatively, said third means may determine said variable time duration according to an amount proportional to intake pressure of the engine and inversely proportional to atmospheric pressure.

Said amount proportional to intake pressure of the engine and inversely proportional to atmospheric pressure may be a ratio of intake pressure of the engine to atmospheric pressure.

In the combustion control system according to the present invention, said means for determining a basic quantity of engine control parameter may determine a basic quantity of fuel injection, and said second means may be selectively put on and off to modify said basic quantity of fuel injection for adaptation to operation of the engine with exhaust gas recirculation and undo such modification, respectively.

Alternatively or in addition, said means for determining a basic quantity of engine control parameter may determine a basic quantity of ignition, and said second means may be selectively put on and off to modify said basic quantity of ignition for adaptation to operation of the engine with exhaust gas recirculation and undo such modification, respectively.

BRIEF DESCRIPTION OF THE DRAWINGS

In the accompanying drawing.

DESCRIPTION OF THE PREFERRED EMBODIMENTS

The present invention will be described in more detail in the form of some preferred embodiments with reference to the accompanying drawings.

Figure 1:
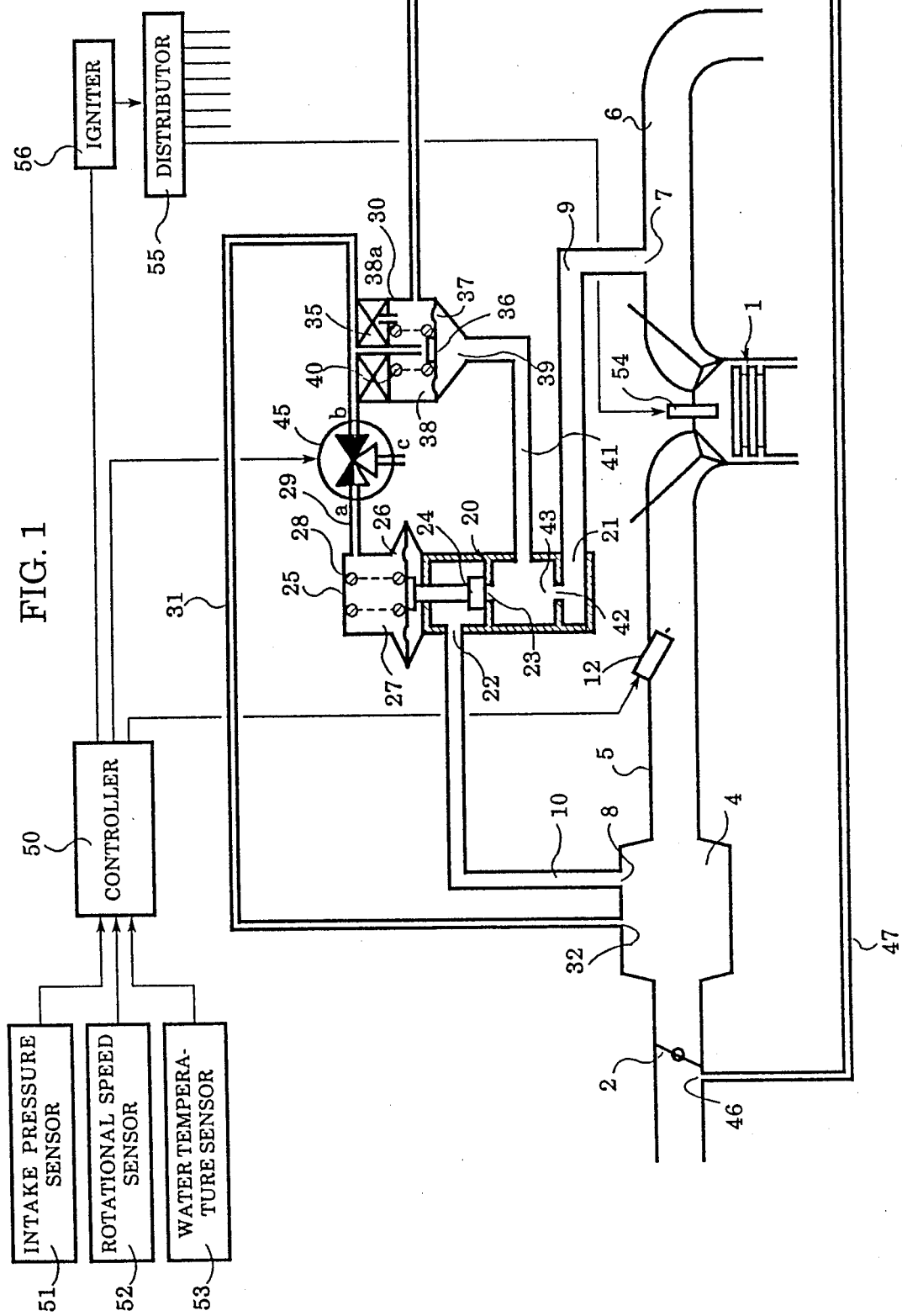
FIG. 1 is a diagrammatical view showing an exhaust gas recirculation system to which the combustion control system according to the present invention is applicable.

In FIG. 1 showing an exhaust gas recirculation system incorporated in an internal combustion engine, the engine is shown only at a cylinder head portion thereof generally designated by reference numeral 1. The engine is adapted to be supplied with intake air through a throttle valve. 2, a surge tank 4 and an intake manifold 5. The engine is also adapted to be supplied with fuel as injected from a fuel injection valve 12, and to exhaust combustion gas through an exhaust manifold 6. The fuel-air mixture supplied into the combustion chamber is ignited by an ignition plug 54.

An exhaust gas take-in port 7 for the exhaust gas recirculation is provided to open in the exhaust manifold 6 so as to take-in a part of the exhaust gas for recirculation toward an exhaust gas injection port 8 opening toward the inside of the surge tank 4 through passages 9 and 10 and an exhaust gas recirculation control valve 20 provided between the passages 9 and 10.

The exhaust gas recirculation control valve 20 has an inlet port 21 connected with the passage 9, an outlet port 22 connected with the passage 10, a passage extending between the inlet port 21 and the outlet port 22 and including an orifice 42, a space chamber 43 and a valve port 23, and a valve element 24 for controlling the opening of the valve port 22. The valve element 24 is adapted to be driven by a diaphragm means 25 having a diaphragm 26, a diaphragm chamber 27 and a compression coil spring 28 biasing the diaphragm 26 downward in the figure to resiliently drive the valve element 24 connected with the diaphragm 26 toward a position to close the valve port 23. The valve element 24 is moved upward in the figure when the diaphragm 26 is biased upward by supply of a vacuum into the diaphragm chamber 27.

The diaphragm chamber 27 is adapted to be selectively supplied with intake vacuum in the surge tank 4 through an intake vacuum take out port 32 and passages 31 and 29 in which a vacuum control valve 30 and a vacuum switching valve 45 are incorporated. The vacuum switching valve 45 operates to control on and off of the exhaust gas recirculation, and therefore this valve will be called "exhaust gas recirculation on-off valve" or "exhaust gas recirculation on-off valve" hereinbelow.

The vacuum control valve 30 has a valve port 35 connected with the passage 31, a valve element 36 controlling the opening of the valve port 35, a diaphragm 37 supporting the valve element 36, a first diaphragm chamber 38 opened toward atmosphere through an orifice 38a, a second diaphragm chamber 39 and a compression coil spring 40 biasing the diaphragm 37 downward in the figure in the direction to remove the valve element 36 away from a position to close the valve port 35. The first diaphragm chamber 38 is connected through a passage 47 with a port 46 opening in the intake passage at a position which is located upstream of the throttle valve 2 when it is fully closed and is located downstream of the throttle valve when it is slightly opened. The second diaphragm chamber 39 is connected through a passage 41 with the chamber space 43 in the exhaust gas recirculation control valve 20.

The combination of the exhaust gas recirculation control valve 20 and the vacuum control valve 30 of the above-mentioned construction is well known in the art of exhaust gas recirculation. The vacuum control valve 30 operates to control the opening of the valve port 35 according to the pressure in the chamber space 43 so as to decrease the vacuum in the passage 31 by more opening the valve port 35 if the pressure in the chamber space 43 lowers so as thereby to cause a downward movement of the diaphragm 26 of the exhaust gas recirculation control valve 20 and accordingly the closing of the valve port 23 thereof. If the valve port 23 is closed, the pressure in the chamber space 43 rises, and therefore the diaphragm 37 of the vacuum control valve 30 rises thereby to close the vacuum port 35, thereby canceling the effect of decreasing the vacuum in the passage 31. According to such a mutual feed back control between the exhaust gas recirculation control valve 20 and the vacuum control valve 30 the pressure in the space chamber 43 is maintained at a constant pressure slightly higher than atmospheric pressure. Therefore, the flow of exhaust gas recirculation which is proportional to the multiplication of the opening area of the orifice 42 and the difference between the exhaust gas pressure at the exhaust gas intake port 7 and a substantially atmospheric pressure in the chamber space 43 is maintained to be proportional to the flow of exhaust gas through the exhaust manifold 6 which is proportional to the multiplication of a throttled opening area equivalent to the exhaust passage downstream of the exhaust gas intake port 7 including the exhaust manifold 6 and having a certain flow resistance and the difference between the exhaust gas pressure at the exhaust gas intake port 7 and atmospheric pressure.

The exhaust gas recirculation according to the above-mentioned control by the combination of the exhaust gas recirculation control valve 20 and the vacuum control valve 30 is carried out when the throttle valve 2 is opened beyond a certain small opening so that the port 46 comes to the downstream side of the throttle valve 2 and a vacuum is available in the diaphragm chamber 38 of the vacuum control valve 30. Therefore, it is possible to control on and off of the exhaust gas recirculation system by the throttle valve 2 so that the exhaust gas recirculation is performed only when the engine is operating at above a certain medium load. However, in order to control the on and off of the exhaust gas recirculation system more accurately according to certain operational conditions of the engine, the exhaust gas recirculation on-off valve 45 is provided to selectively communicate the passage 29 or to interrupt this passage and to open the diaphragm chamber 27 of the exhaust gas recirculation control valve 20 to the atmosphere so as thereby definitely cut off the exhaust gas recirculation passage.

The exhaust gas recirculation on-off valve 45 is controlled by a controller 50 between an on state in which ports a and b thereof are communicated with one another while a port c thereof opened toward the atmosphere is isolated from both the ports a and b and in an off state in which the port a is isolated from the port b and is connected with the port c. The controller 50 controls the exhaust gas recirculation on-off valve 45 and the fuel injection valve 12 so as to control on and off of the exhaust gas recirculation and the amount and the timing of fuel injection based upon the data with regard to the intake pressure detected by an intake pressure sensor 51, rotational speed of the engine detected by a rotational speed sensor 52 and engine temperature detected by a water temperature sensor 53. By this control system the on and off of the exhaust gas recirculation system is positively controlled so that the exhaust gas recirculation is carried out only when the multiplication of the intake pressure Pm and the rotational speed Ne of the engine is larger than a predetermined value, while Pm is less than a predetermined maximum limit value therefor and Ne is less than a maximum limit value therefor.

Figure 2:
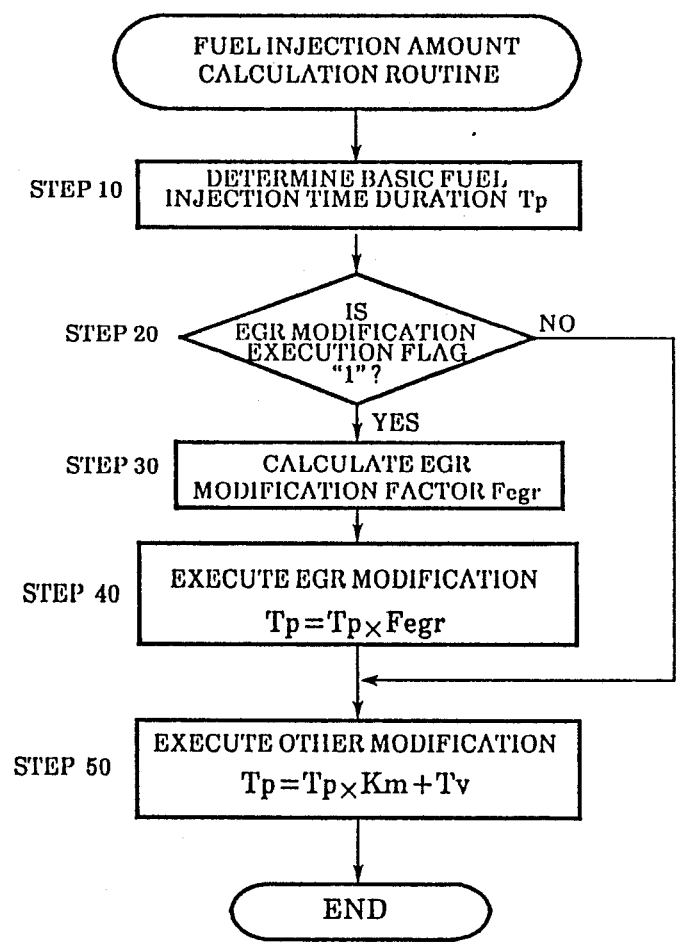
FIG. 2 is a flow chart illustrating the basic operation routine of the combustion control system according to the present invention for executing the modification of the amount of fuel injection for adaptation to the exhaust gas recirculation (referred to hereinafter by "EGR modification")

The controller 50 carries out a fuel injection amount calculation as illustrated in FIG. 2 in the form of a flow chart. As shown in the flow chart, first in step 10 a basic quantity of fuel injection is calculated in the term of a basic fuel injection time duration Tp based upon the intake pressure Pm. A prearranged correlation between the quantities Pm and Tp is stored in the memory of the controller 50 including an electronic computing system, and the respective values of Tp are determined according to the respective values of Pm. Then the process proceeds to step 20.

In step 20, it is judged if a flag F indicating the operation of the exhaust gas recirculation system, i.e. execution of exhaust gas recirculation, is "1" or not. If the flag is "1", it means that the exhaust gas recirculation is being executed, and if so the process proceeds to step 30, otherwise the process proceeds to step 50.

In step 30, a modification factor Fegr for modifying the amount of fuel injection for adaptation to the exhaust gas recirculation is calculated. The factor Fegr, i.e. EGR modification factor, is a quantity smaller than 1.0 so as to decrease the amount of fuel injection during the exhaust gas recirculation as compared with the basic amount, and is determined based upon some parameters specifying the amount of exhaust gas recirculation such as the intake pressure, the rotational speed of the engine, etc.. However, the EGR modification factor Fegr may be a constant amount. Then the process proceeds to step 40.

In step 40 the basic fuel injection time duration Tp is modified according to the following formula:

$$Tp = Tp \times \text{Fegr}.$$

By this modification the fuel injection time duration Tp is decreased as compared with the basic fuel injection time duration. Then the process proceeds to step 50.

In step 50, the modified fuel injection time duration Tp is further modified according to the following formula:

$$Tp = Tp \times Km + Tv.$$

Herein Km is a modification factor appropriately determined according to the engine cooling water temperature detected by the water temperature sensor 53, and Tv is an invalid injection time particular to the fuel injection valve 12.

The fuel injection valve 12 is controlled to be opened for the time duration Tp according to a timing which is also read out from the memory in the controller 50.

Figure 3:
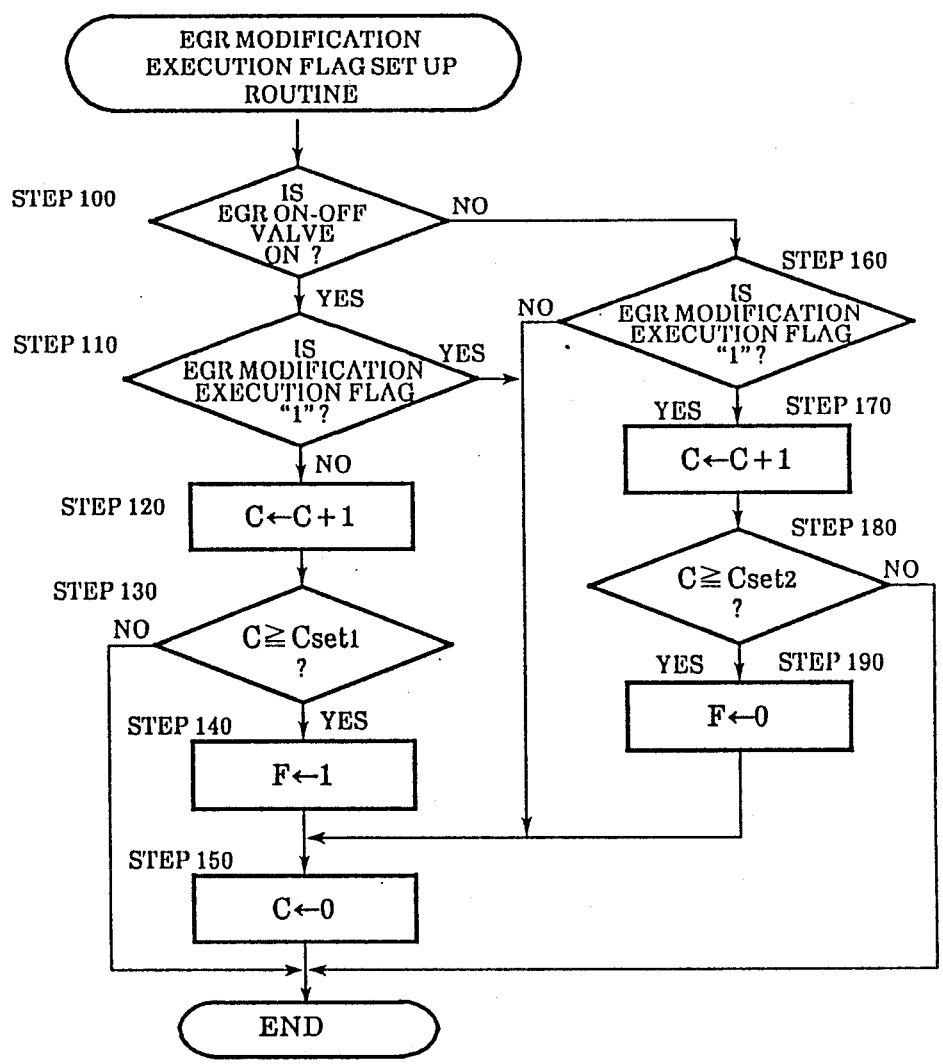
FIG. 3 is a flow chart illustrating a sub operation routine of the combustion control system according to the present invention for setting up and down a flag for indicating execution of the EGR modification.

The EGR modification execution flag F is controlled according to a sub operation routine shown in FIG. 3. The sub operation routine of FIG. 3 is carried out as periodically interposed between successive executions of the basic operation routine shown in FIG. 2. According to this sub operation routine, in step 100, it is judged if the exhaust gas recirculation on-off valve 45 is on or not. If the valve 45 is on, the process proceeds to step 110, otherwise the process proceeds to step 160.

In step 110, it is judged if the EGR modification execution flag F is "1" or not. If the flag F is not "1", it means that the EGR modification for the amount of fuel injection is not carried out. At this time the process proceeds to step 120, otherwise the process proceeds to step 150. In step 120, a counter is counted up by one, and the process proceeds to step 130.

In step 130, it is judged if the count value C of the counter is equal to or greater than a predetermined set value $C_{set1}$. The set value $C_{set1}$ corresponds to the amount of the delay time for starting the EGR modification of the amount of fuel injection from the time point of switching over of the exhaust gas recirculation on-off valve 45 by the controller 50, and may be determined according to a process as shown in a flow chart in FIG. 4 of which a description will be made later in the specification. If the count value C is equal to or greater than $C_{set1}$, it means that the predetermined period corresponding to $C_{set1}$ has passed from the time point of switching over of the valve 45 to the on state. In this case the process proceeds to step 140, otherwise the process is finished.

In step 140, the EGR modification execution flag F is set to "1", and the process proceeds to step 150. In step 150 the count value C of the counter is reset to zero.

In step 160, it is judged if the flag F is "1" or not. If the flag F is "1", it means that the EGR modification for the amount of fuel injection is being carried out. In this case the process proceeds to step 170, otherwise the process proceeds to step 150.

In step 170, the count value C of the counter is counted up for one. Then the process proceeds to step 180.

In step 180, it is checked if the count value C is equal to or greater than a preset value $C_{set2}$ or not. The preset value $C_{set2}$ corresponds to the amount of delay time for stopping the EGR modification for the amount of fuel injection from the time point of switching over of the exhaust gas recirculation on-off valve 45 from the on state to the off state. The value of $C_{set2}$ may be determined to a constant value. If C is equal to or greater than $C_{set2}$, the process proceeds to step 190, otherwise the process is finished. In step 190, the flag F is set to zero.

Figure 4:
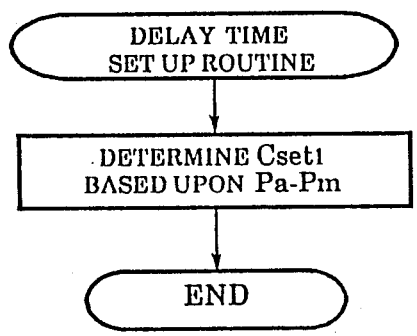
FIG. 4 is a flow chart illustrating a sub operation routine of the combustion control system according to the present invention for determining the amount of delay time.
Figure 5:
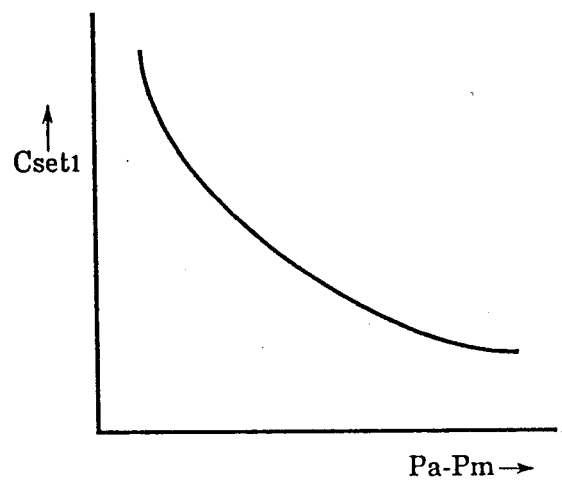
FIG. 5 is a graph showing a performance to be incorporated in the sub operation routine in FIG. 4.

As shown in FIG. 4 the value $C_{set1}$ corresponding to the amount of delay time for starting the EGR modification for the amount of fuel injection from the time point of switching over of the exhaust gas recirculation on-off valve 45 from the off state to the on state may be determined according to the difference between the atmospheric pressure Pa and the intake pressure Pm. The amount of Pa−Pm corresponds to the amount of the intake vacuum. Since the delay in operation of the exhaust gas recirculation control valve 20 powered by the intake vacuum is larger as the intake vacuum is smaller, $C_{set1}$ should be larger as the intake vacuum is smaller. Therefore, the performance of $C_{set1}$ with respect to Pa−Pm is generally as shown in FIG. 5. The atmospheric pressure Pa may be detected by the intake pressure sensor 51 before the starting up of the engine. However, a separate atmospheric pressure sensor may be provided for detecting the atmospheric pressure Pa so that the value thereof is obtained at any moment when required.

Although the preset value $C_{set2}$ for setting up the amount of delay time for stopping the EGR modification for the amount of fuel injection from the time point of switching over of the exhaust gas recirculation on-of valve 45 from the on state to the off state may be a constant value as described above, this preset value may also be determined according to the difference Pa−Pm like the preset value $C_{set1}$. Further, the value of $C_{set1}$ or the values of $C_{set1}$ and $C_{set2}$ may be determined based upon an amount proportional to intake pressure of the engine and inversely proportional to atmospheric pressure such as, for example, the ratio between the intake pressure Pm and the atmospheric pressure Pa as described later in the specification.

Figure 6:
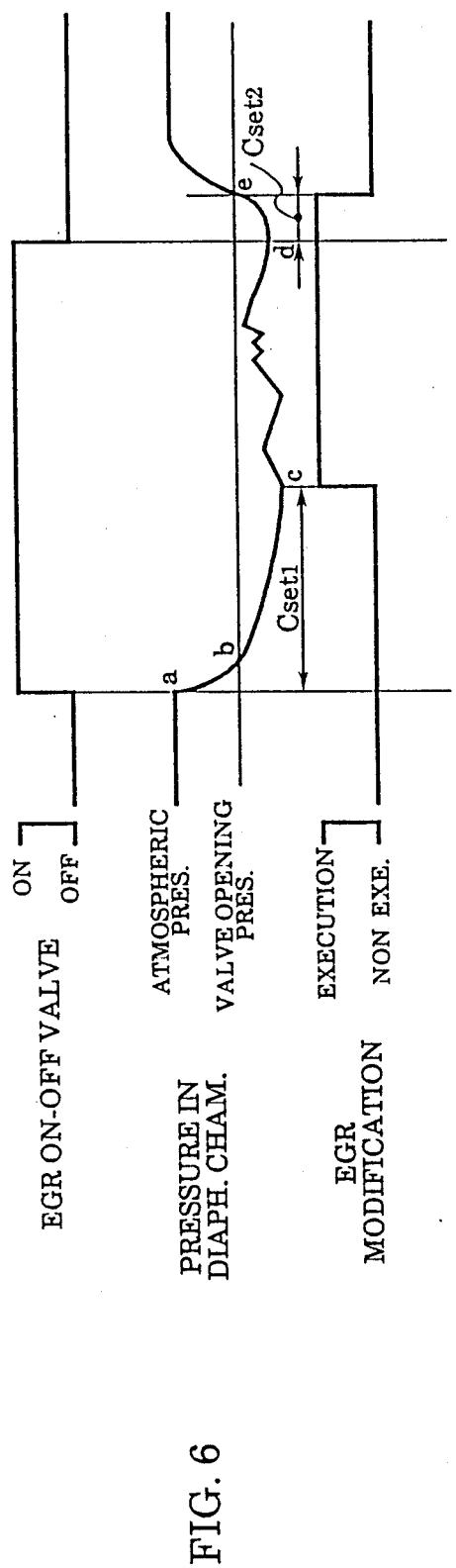
FIG. 6 is a diagram illustrating the operation of the exhaust gas recirculation system of FIG. 1 in relation with the operation of the combustion control system according to the present invention.
Figure 7:
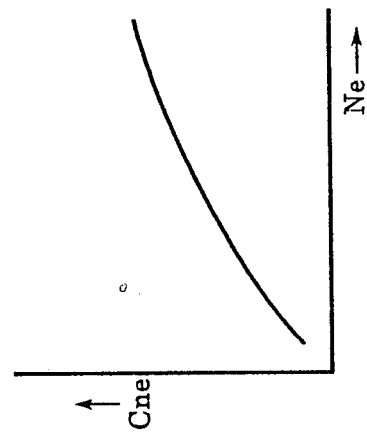
FIG. 7 is a flow chart illustrating another sub operation routine for determining the amount of time delay similar to FIG. 4.
Figure 8:
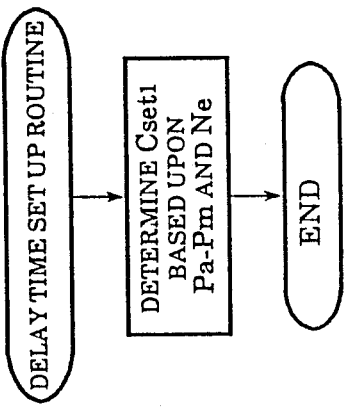
FIG. 8 is a graph showing a performance to be incorporated in the sub operation routine in FIG. 7.

FIG. 6 shows a correspondence between the performances of the exhaust gas recirculation on-off valve 45, the pressure in the diaphragm chamber 27 of the exhaust gas recirculation control valve 20 and execution and non execution of the EGR modification for the amount of fuel injection. When the valve 45 was switched over from the off state to the on state at a time point a, it begins that the air in the diaphragm chamber 27 is evacuated through the passages 29 and 31. Then at a time point b the pressure in the diaphragm chamber 27 becomes to a pressure level which starts opening of the valve port 23. Then at a time point c the pressure in the diaphragm chamber 27 finally reaches to a pressure level to provide a predetermined rate of exhaust gas recirculation. It would be desirable that the set value $C_{set1}$ is determined to correspond to the period between the time points a and c. The delay time between the time points a and c is generally dependent on the difference between the atmospheric pressure at the port c and the intake pressure at the port b, while the delay time between the time points b and c is generally dependent on the valve lift of the exhaust gas recirculation control valve 20. Since the valve lift of the exhaust gas recirculation control valve is dependent on the intake pressure Pm and the engine rotational speed Ne, the value $C_{set1}$ may be dependent more precisely on the intake pressure Pm, atmospheric pressure and the engine rotational speed Ne. Therefore, the value $C_{set1}$ may be more precisely determined according to a delay time determining routine as shown in FIG. 7. According to this routine the value $C_{set1}$ is determined by a multiplying combination of the performance shown in FIG. 5 and a performance shown in FIG. 8 in which the variation of a factor Cne for modifying the performance shown in FIG. 5 is given in relation to the engine rotational speed Ne.

Figure 9:
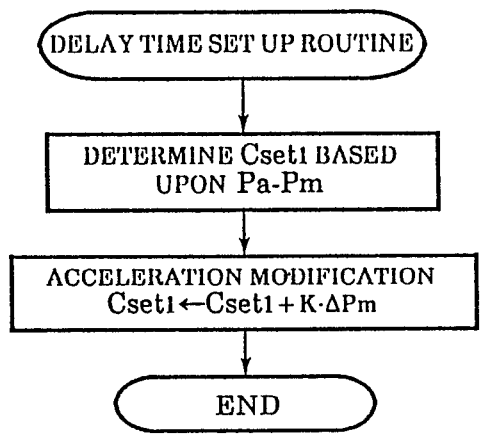
FIG. 9 is a flow chart illustrating a sub operation routine for incorporating a change of delay time performance due to acceleration of the engine into the operation of the combustion control system according to the present invention.

The values of the atmospheric pressure Pa and the intake pressure Pm for determining the set value $C_{set1}$ may be detected at the time point of switching over of the exhaust gas recirculation on-off valve 45 from the off state to the on state or may be detected at each time when the value $C_{set1}$ is determined. When the engine is in a stable operating condition the difference between the atmospheric pressure Pa and the intake pressure Pm will not change much during the engine operation, and therefore the method of one time initial detection of these pressures will ensure a stable control. In this case, however, since the intake pressure Pm substantially increases during acceleration of the engine, the correlation between the value of $C_{set1}$ and the value of the difference between the atmospheric Pa and the intake pressure Pm should be modified for acceleration of the engine. Since the intake pressure approaches the atmospheric pressure during acceleration of the engine, the value of $C_{set1}$ obtained based upon the initial detection of the difference between the atmospheric pressure and the intake pressure will become deficient during the acceleration in order to conform to a greater delay of response in the virtual operation of the exhaust gas recirculation system. Therefore, in this case, the value of $C_{set1}$ obtained according to the predetermined correlation between $C_{set1}$ and Pa−Pm is modified according to a delay time set up routine as shown in FIG. 9 by an addition of K·Δ Pm, wherein Δ Pm is the rate of variation of Pm per time during acceleration of the engine and K is a constant factor.

Figure 10:
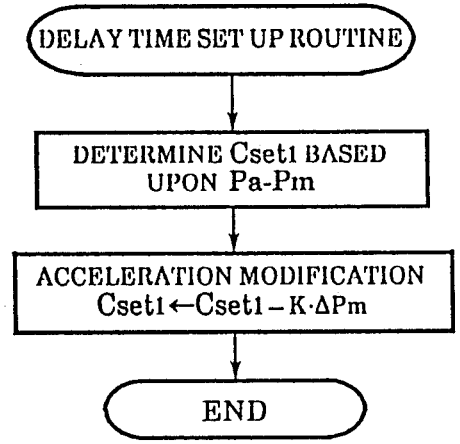
FIG. 10 is a flow chart similar to FIG. 9 but showing a case in which the intake pressure is detected at a different time point.

On the other hand, when the intake pressure is detected at each time when $C_{set1}$ is determined, the value of $C_{set1}$ obtained based upon the prearranged correlation between $C_{set1}$ and Pa−Pm will become larger than really required because of the temporary decrease of the difference Pa−Pm during acceleration of the engine. Therefore, in this case the values of $C_{set1}$ obtained based upon the respective values of Pa−Pm are further modified according to a delay time set up routine as shown in FIG. 10 by a subtraction of K·Δ Pm, wherein Pm is also the rate of variation of Pm per time during acceleration of the engine and K is a constant factor.

Figure 11:
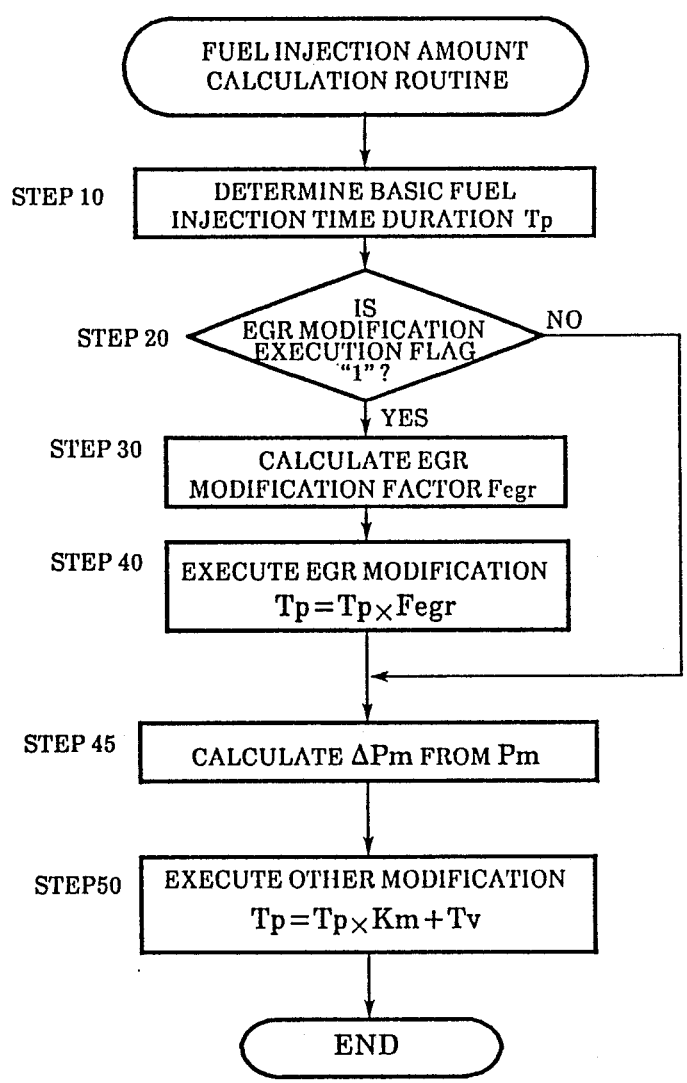
FIG. 11 is a flow chart illustrating a modification of the basic operation routine shown in FIG. 2 for incorporating therein the sub operation routine shown in FIG. 9 or 10.

FIG. 11 shows a modification of the basic fuel injection control routine shown in FIG. 2 for incorporation of the modification of $C_{set1}$ during acceleration of the engine. In the routine shown in FIG. 11, in step 45 the rate of variation per time of the intake pressure is calculated. Based upon the value of Δ Pm thus calculated the sub operation routine of FIG. 9 or 10 is carried out as appropriately interposed between two successive repetitions of the basic fuel injection control routine.

Figure 12:
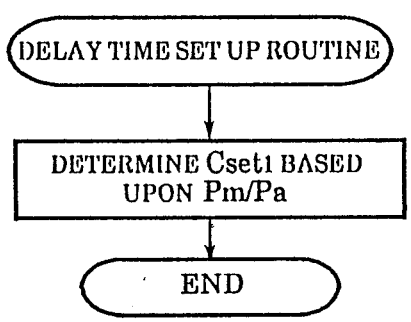
FIG. 12 is a flow chart illustrating still another operation routine for determining the amount of delay time based upon the ratio between the intake pressure and atmospheric pressure.
Figure 13:
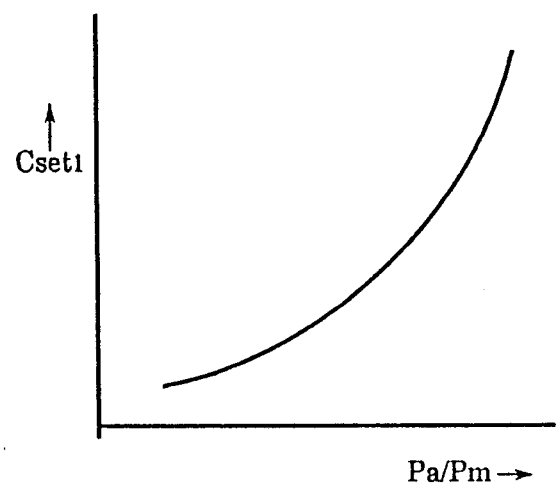
FIG. 13 is a graph showing a performance to be incorporated in the operation routine in FIG. 12.

FIG. 12 shows another embodiment of the delay time set up routine for determining of the value of $C_{set1}$ according to the ratio of the intake pressure to the atmospheric pressure, i.e. Pm/Pa. FIG. 13 is a graph showing a general performance of $C_{set1}$ with respect to Pm/Pa according to the routine of FIG. 12. As shown in the graph of FIG. 13, the value of $C_{set1}$ is determined to be larger as the ratio Pm/Pa increases to approach 1.0.

Figure 14:
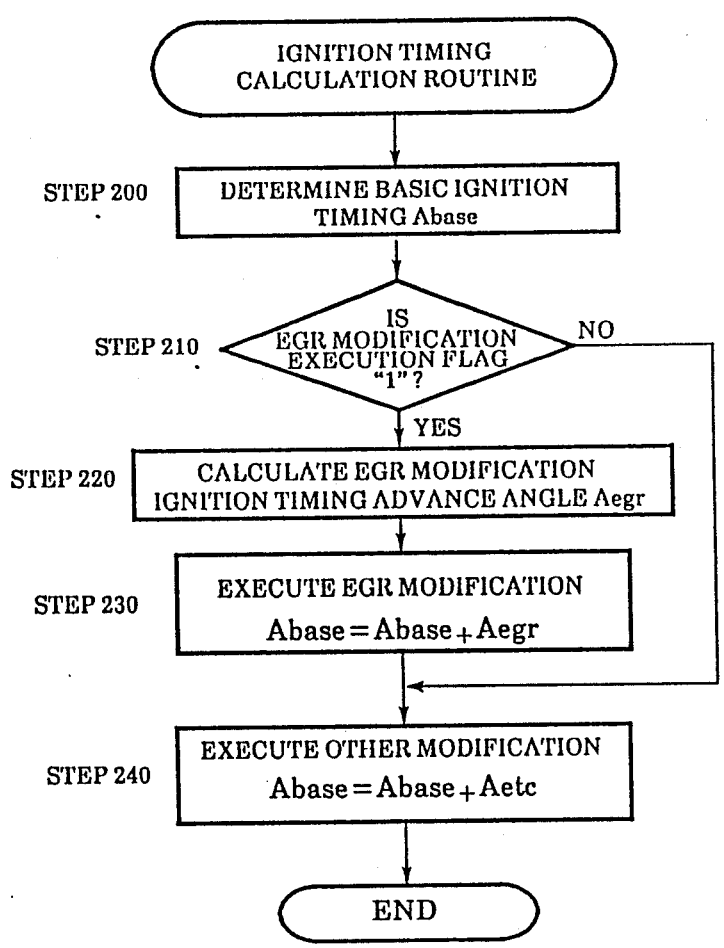
FIG. 14 is a flow chart illustrating an operation routine which may further be incorporated in the combustion control system according to the present invention for controlling the ignition timing of the engine in relation with on and off of the exhaust gas recirculation.

It is desirable that the ignition timing is also controlled in relation with the EGR modification as shown in FIG. 2 by an igniter 56 for energizing the spark plug 54 via a distributor 55 being placed under the control of the controller 50. FIG. 14 shows a flow chart for controlling the ignition timing of the engine in relation with the EGR modification of the amount of fuel injection for the exhaust gas recirculation. In order to reflect the delay time control applied to the EGR modification of the amount of fuel injection the same flag F as employed in the fuel injection amount control routine shown in FIG. 2 or in FIG. 11 is incorporated in the ignition timing control routine shown in FIG. 14. According to this ignition timing control routine, in step 200 a basic ignition timing Abase is determined in relation with the basic fuel injection time duration Tp. Then the process proceeds to step 210.

In step 210 it is judged if the flag F is "1". If the flag is "1", the process proceeds to step 220, otherwise the process proceeds to step 240.

In step 220 an EGR modification ignition timing advance angle Aegr which corresponds to an advance of angle for adaptation of the ignition timing to the execution of exhaust gas recirculation and the corresponding exhaust gas recirculation modification of the amount of fuel injection is determined, and the process proceeds to step 230.

In step 230, the basic ignition timing Abase is modified by the addition of the Aegr, and then the process proceeds to step 240.

In step 240, the basic ignition timing Abase is further modified by an addition of other modification advance angle Aetc to provide a final ignition timing.

By the ignition timing control according to the routine shown in FIG. 14, the ignition timing of the engine is also modified to conform to the time delay of the EGR modification of the amount of fuel injection.

Although the invention has been described in detail with respect to some preferred embodiments thereof it will be understood by those skilled in the art that other various embodiments an/or modifications are possible without departing from the scope of the invention.

I claim:

1. For an internal combustion engine having an intake passage, an exhaust passage, and an exhaust gas recirculation system including an exhaust gas recirculation passage for recirculating exhaust gas from said exhaust passage to said intake passage, an exhaust gas recirculation control valve powered by a difference between atmospheric pressure and intake pressure in said intake passage for variably throttling said exhaust gas recirculation passage, and an exhaust gas recirculation on-off valve selectively put on or off so as, when put on, to supply said intake pressure to said exhaust gas recirculation control valve and, when put off, to interrupt supply of said intake pressure to said exhaust gas recirculation control valve, a combustion control system comprising:

first means for determining a basic quantity of engine control parameter according said intake pressure, second means selectively put on and off so as, when put on, to modify said basic quantity of engine control parameter so as thereby to provide a modified quantity of engine control parameter for adaption to operation of the engine with exhaust gas recirculation and, when put off, to undo such modification to the basic quantity of engine control parameter, and third means for delaying the putting on and off of said second means from the time point of putting on and off of said exhaust gas recirculation on-off valve for a variable time duration determined according to an amount proportional to intake pressure of the engine and inversely proportional to atmospheric pressure.

2. A combustion control system according to claim 1, wherein said third means determines said variable time duration according to a ratio of intake pressure of the engine to atmospheric pressure.

3. A combustion control system according to claim 1, wherein said means for determining a basic quantity of engine control parameter determines a basic quantity of fuel injection, and said second means is selectively put on and off to modify said basic quantity of fuel injection for adaption to operation of the engine with exhaust gas recirculation and undo such modification, respectively.

4. A combustion control system according to claim 1, wherein said means for determining a basic quantity of engine control parameter determines a basic quantity of ignition, and said second means is selectively put on and off to modify said basic quantity of ignition for adaption to operation of the engine with exhaust gas recirculation and undo such modification, respectively.

5. A combustion control system according to claim 1, wherein said means for determining a basic quantity of engine control parameter determines a basic quantity of fuel injection and a basic quantity of ignition, and said second means is selectively put on and off to modify said basic quantity of fuel injection and said basic quantity of ignition for adaption to operation of the engine with exhaust gas recirculation and undo such modifications, respectively.

6. For an internal combustion engine having an intake passage, an exhaust passage, and an exhaust gas recirculation system including an exhaust gas recirculation passage for recirculating exhaust gas from said exhaust passage to said intake passage, an exhaust gas recirculation control valve powered by a difference between atmospheric pressure and intake pressure in said intake passage for variably throttling said exhaust gas recirculation passage, and an exhaust gas recirculation on-off valve selectively put on or off so as, when put on, to supply said intake pressure to said exhaust gas recirculation control valve and, when put off, to interrupt supply of said intake pressure to said exhaust gas recirculation control valve, a combustion control system comprising:

first means for determining a basic quantity of engine control parameter according to said intake pressure, second means selectively put on and off so as, when put on, to modify said basic quantity of engine control parameter so as thereby to provide a modified quantity of engine control parameter for adaptation to operation of the engine with exhaust gas recirculation and, when put off, to undo such modification to the basic quantity of engine control parameter, and third means for delaying the putting on and off of said second means from the time point of putting on and off of said exhaust gas recirculation on-off valve for a variable time duration determined according to the difference between atmospheric pressure and intake pressure of the engine in such a manner that said variable time duration is smaller as said difference is larger.

7. A combustion control system according to claim 6, said third means further modifies said variable time duration according to rotational speed of the engine so that said variable time duration is larger for a same amount of the difference of atmospheric pressure and intake pressure of the engine as the rotational speed of the engine is greater.

8. A combustion control system according to claim 6, wherein said third means further modifies said variable time duration according to rate of acceleration of the engine.

9. A combustion control system according to claim 6, wherein said means for determining a basic quantity of engine control parameter determines a basic quantity of fuel injection, and said second means is selectively put on and off to modify said basic quantity of fuel injection for adaptation to operation of the engine with exhaust gas recirculation and undo such modification, respectively.

10. A combustion control system according to claim 6, wherein said means for determining a basic quantity of engine control parameter determines a basic quantity of ignition, and said second means is selectively put on and off to modify said basic quantity of ignition for adaptation to operation of the engine with exhaust gas recirculation and undo such modification, respectively.

11. A combustion control system according to claim 6, wherein said means for determining a basic quantity of engine control parameter determines a basic quantity of fuel injection and a basic quantity of ignition, and said second means is selectively put on and off to modify said basic quantity of fuel injection and said basic quantity of ignition for adaptation to operation of the engine with exhaust gas recirculation and undo such modifications, respectively.

* * * * *

UNITED STATES PATENT AND TRADEMARK OFFICE
CERTIFICATE OF CORRECTION

PATENT NO. : 4,947,820

DATED : 14 August 1990

INVENTOR(S) : Naoto KUSHI

It is certified that error appears in the above-identified patent and that said Letters Patent is hereby corrected as shown below:

| Column | Line | |
|---|---|---|
| 1 | 46 | After "operation" insert --so--. |
| 2 | 48 | After "according" insert --to--. |
| 5 | 34 | Delete "more" and insert --further--. |
| 6 | 13 | After "as" insert --to--. |
| 8 | 29 | Change "on-of" to -- on-off --. |
| 8 | 51-52 | Delete "be-comes to" and insert --reaches--. |
| 8 | 53 | After "reaches" delete "to". |
| 12 | 18 | Before "said" insert --wherein--. |

Signed and Sealed this

Seventh Day of January, 1992

Attest:

HARRY F. MANBECK, JR.

Attesting Officer     Commissioner of Patents and Trademarks